July 26, 1932.  W. SCHNEIDER  1,868,768
DIVERTER VALVE
Filed April 18, 1930
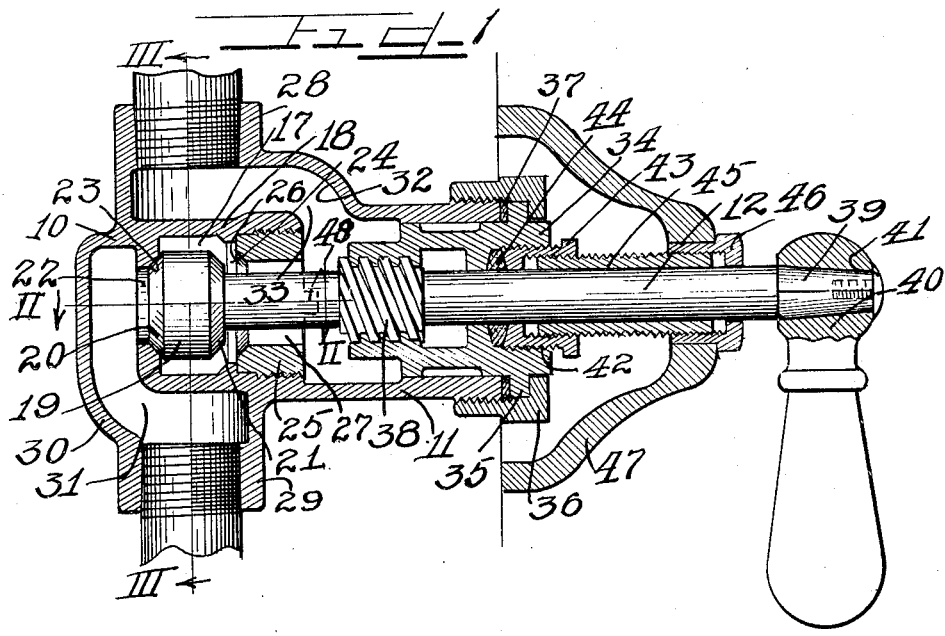
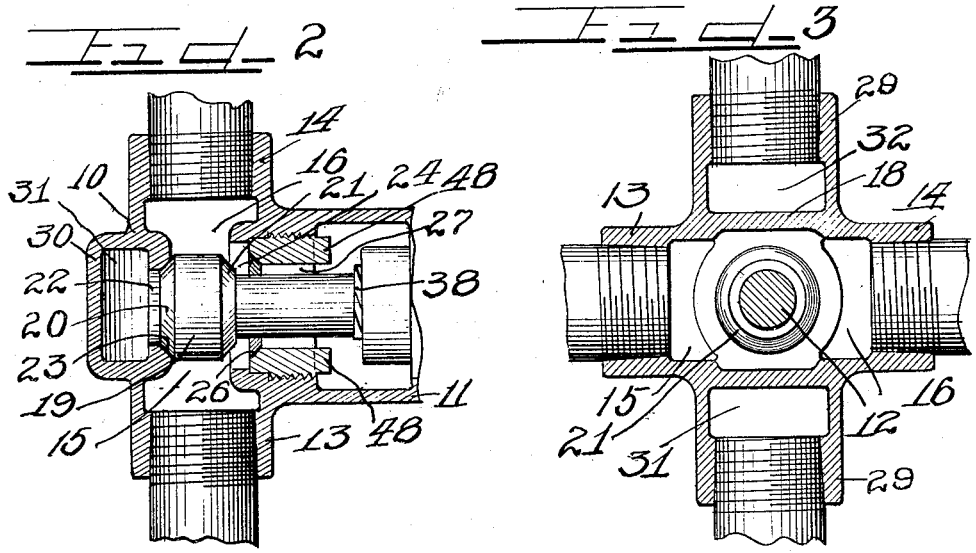
Inventor
William Schneider Patented July 26, 1932

1,868,768

UNITED STATES PATENT OFFICE

WILLIAM SCHNEIDER, OF ERIE, PENNSYLVANIA, ASSIGNOR TO HAYS MANUFACTURING CO., OF ERIE, PENNSYLVANIA, A CORPORATION OF PENNSYLVANIA

DIVERTER VALVE

Application filed April 18, 1930. Serial No. 445,288.

My invention relates to diverter valve structures particularly adaptable for receiving and mixing hot and cold water, as, for example, to a bath tub or a shower bath nozzle.

An important object of the invention is to provide a short seat ring detachably threaded in the valve casing to form one of the seats for the diverting valve.

Another important object is to provide a guide sleeve or bonnet for the valve stem which is separate from the seat ring and which does not have threaded engagement with the valve body so that it can be accurately set in any desired position within the valve body.

A further object is to provide an arrangement which will permit the valve bonnet to be readily withdrawn from the valve body to expose the seat ring so that such ring may be readily withdrawn for replacement or repair without removing or disturbing the valve body after it has been installed for service.

The above and other features of my invention are incorporated in the structure shown on the drawing, in which drawing;

Figure 1 is a diametral sectional view of the valve structure;

Figure 2 is a section on line II—II of Figure 1; and

Figure 3 is a section on plane III—III of Figure 1.

The valve body comprises a casing part 10 having the extension 11 at one side for receiving the valve stem 12. The casing has opposite inlet bosses 13 and 14 providing inlet passageways 15 and 16 respectively which at all times communicate with the mixing chamber 17 formed within the valve casing by inner wall structures 18.

The valve stem 12 extends axially through the valve body extension 11 which is cylindrical, and the stem terminates in the mixing chamber in a valve head 19 which has the outer and inner beveled valving surfaces 20 and 21. At its outer side the wall structure 18 has the valve port 22 concentric with the body extension 11 and providing the beveled seat 23 for the valve surface 20. The inner side of the wall structure 18 has the outlet passageway 24 which is threaded to receive a seat ring 25, which ring at its end presents the beveled valve seat 26 for the valve surface 21, the inner diameter of the seat ring being greater than the diameter of the valve stem to provide the outlet passageway 27 through the seat ring.

Between the inlet bosses 13 and 14 and displaced 90° therefrom are the opposite outlet bosses 28 and 29 on the valve casing part. An enlargement 30 on the casing part forms with the outlet boss 29 the outlet passageway 31 with which the outlet port 22 communicates. An enlargement 32 between the casing and the body extension 11 forms with the outlet boss 28 the outlet passageway 33 from the interior of body extension 11 which communicates with the passageway 27 through the seat ring 25.

The valve stem 12 is guided by and operable in a guide bushing or bonnet 34 which does not have threaded engagement with the valve body extension 11 but which fits accurately and rotationally in the end of the extension. The annular flange 35 on the bonnet engages the outer edge of the body extension 11 to determine the position of the bonnet within the extension, and a nut or cap 36 has threaded engagement with the outside of the extension 11 to abut against the flange 35 of the bonnet to hold the bonnet securely in position, a gasket 37 of suitable material being preferably interposed between the flange 35 and the extension.

At its inner end the bonnet bore is threaded to receive the threaded hub 38 on the valve stem, the threading being preferably multiple and of long lead so that a small angle of rotation of the valve stem will result in considerable longitudinal movement of the valve stem in order to rapidly shift the valve head 19 into engagement with either of the seats 23 or 26. The outer end 39 of the valve stem is polygonal to receive a suitable handle structure 40 detachably held in place by a screw 41 in the well known manner.

At its outer end the bonnet 34 has a packing pocket 42 surrounding the stem into which a packing plug 43 threads to compress suitable packing material 44 around the stem in order to prevent leakage. This plug 43 is internally threaded for receiving a sleeve 45 having a head 46 at its outer end for engaging an escutcheon frame or fitting 47 to hold such fitting against a wall, as for example, the wall of the bath tub with which the valve structure is associated.

Describing now the operation of the valve structure, hot and cold water are conducted to the inlet passageways 15 and 16 respectively by suitable pipes through which the flow is controlled by suitable valve structures (not shown) the hot and cold water meeting in the mixing chamber 17 to be thoroughly mixed therein. When the valve stem is in, the valve head 19 will engage the seat 23 to close the port 22 so that the mixed hot and cold water may flow past the exposed valve seat 26 and through the seating ring 25 into the interior of the extension 11 from where it flows through the passageway 33 to the source of demand which may be a shower bath nozzle. When the valve stem is moved out it engages against the seat 26 to shut off the flow through the outlet passageway 33, and the flow is diverted through the opened port 22 to the outlet passageway 31 which may extend to the bath tub. It will be noted that while the valve head is being brought against or removed from its respective valve seats the valve head will be rotated and the valve and valve seat surfaces are given a grinding treatment which will keep them smooth and accurately interfitting.

Should the valve head and seats require additional grinding or finishing, the valve stem can be readily removed. After the handle structure 40 and the escutcheon fitting 47 are removed, the nut 36 is withdrawn to release the bonnet 34 which, by rotational movement, can then be readily unscrewed from the valve stem and then withdrawn from the valve body extension 11. The seating ring 25 may be provided with lugs 48 for receiving a tool inserted through the extension 11 so that this seating ring may be readily unscrewed and removed, whereafter the valve stem may be withdrawn, the valve head readily passing through the opening 24 provided in the wall structure 18. The seat on the withdrawn seating ring and the valve surfaces on the withdrawn valve stem can then be readily ground and finished, and with a suitable tool introduced through the extension 11 the valve seat 23 may be refinished.

To assemble the parts, the valve stem is first inserted into the valve body and then the valve seating ring 25 is inserted, the opening 27 through this ring being sufficiently large so that the ring will pass over the threaded hub 38 on the stem. After insertion of the valve stem the bonnet 34 is inserted and applied to the threaded hub of the stem whereafter the locking nut 35 is applied.

It will be noted that, as the bonnet does not have threaded engagement with the valve body extension 11, the bonnet and the valve stem can be readily and accurately set to any position so that the handle structure 40 will be in the proper indicating position relative to the direction markings or indications usually on the escutcheon structure 47. Where the valve structure is used to divert water to either a bath tub or a shower bath nozzle the markings on the escutcheon fitting might be "Tub" and "Shower", swing of the handle structure to either of these indications then resulting in the corresponding flow of water.

I thus produce a simple, efficient and economically manufactured diverter valve structure in which the operating parts may be readily and accurately set and adjusted and can be readily removed without disturbing the body of the valve structure after it has been installed for service. I do not desire to be limited to the exact construction, arrangement and operation shown and described as changes and modifications may be made without departing from the scope and principles of the invention.

I claim as follows:

A diverter valve of the class described, comprising the combination of a valve casing and a lateral extension thereon having a cylindrical bore, said casing having inlet openings, two outlets for said casing one of which branches from the lateral extension, a valve within said casing selectively controlling the two outlets, a removable seating ring for said valve mounted in said casing concentric with the valve, operating means for said valve including a handle the position of which indicates the outlet which is open, the operating means including a rotatable valve stem, a guide bushing for the valve stem in the extension bore at the outer end thereof, a threaded hub on the valve stem, the inner end of the guide bushing being threaded to receive said hub, said guide bushing being rotatable relative to the extension bore in the extension whereby to adjust the indicating handle position to compensate for wear or variations in assembly, and means for clamping said guide bushing in adjusted position in said extension bore.

In testimony whereof I have hereunto subscribed my name at Erie, Erie County, Pennsylvania.

WILLIAM SCHNEIDER.